March 24, 1953 — J. J. WALL — 2,632,294
FUEL SUPPLYING MEANS FOR JET ENGINES
Filed April 19, 1948 — 2 SHEETS—SHEET 1
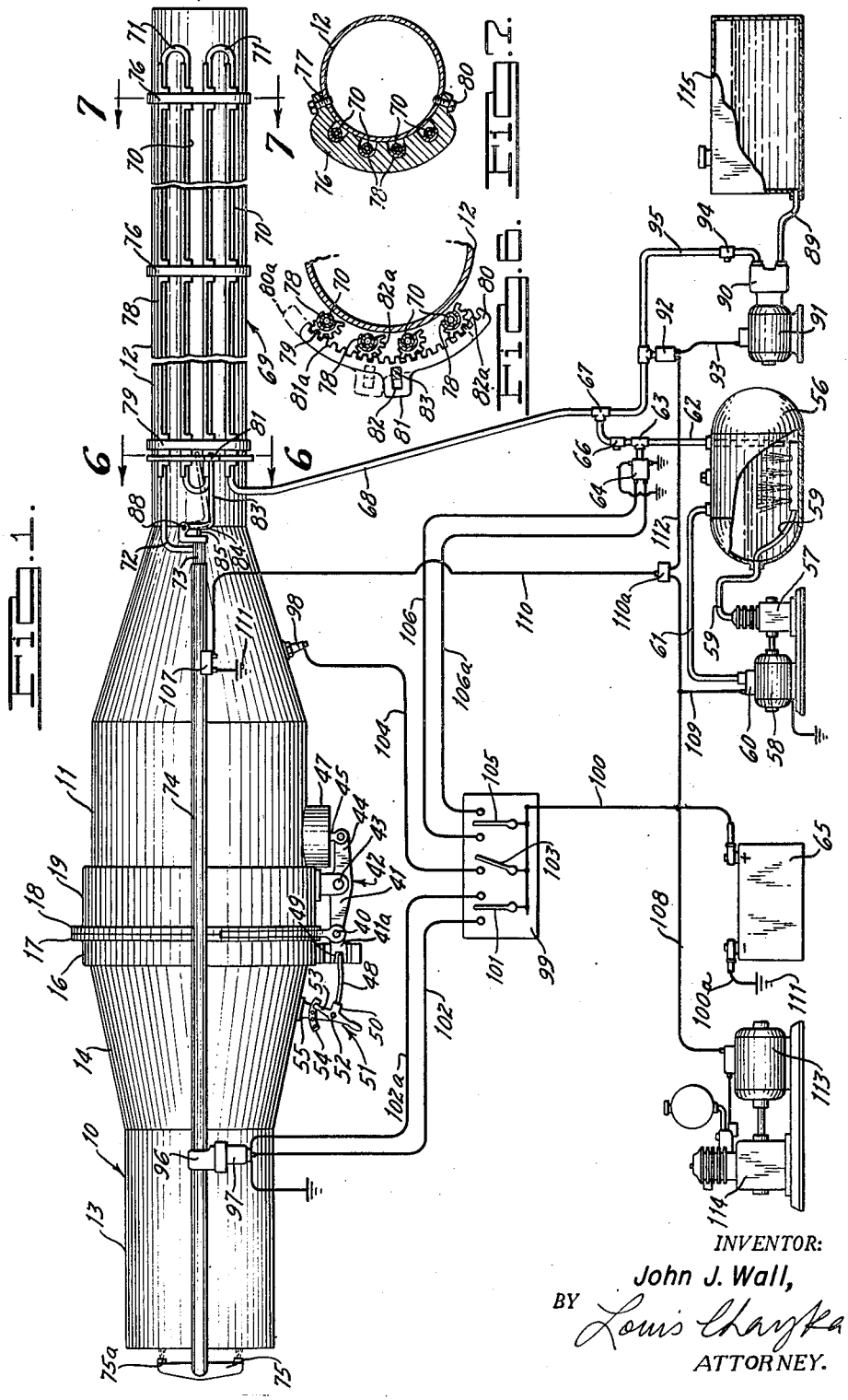
INVENTOR:
John J. Wall,
BY Louis Chayka
ATTORNEY.

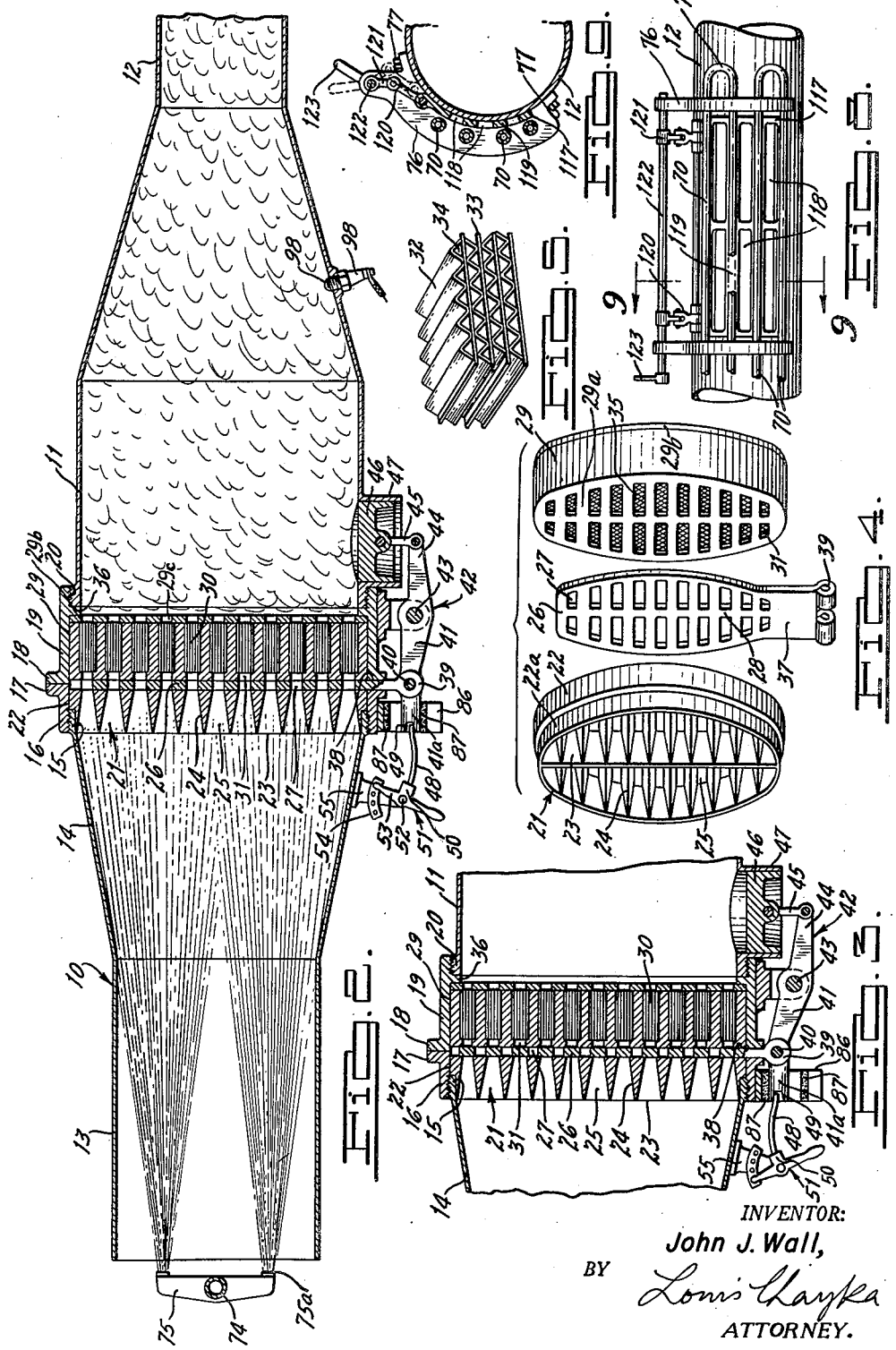

Patented Mar. 24, 1953

2,632,294

UNITED STATES PATENT OFFICE 2,632,294

FUEL SUPPLYING MEANS FOR JET ENGINES

John J. Wall, Detroit, Mich.

Application April 19, 1948, Serial No. 22,002

4 Claims. (Cl. 60—35.6)

My improvement pertains, generally, to jet engines in which the explosive force of fuel, burned therein in a combustion chamber and leaving the engine in a jet, provides a driving thrust to propel the body of an airplane, boat, or other vehicle. More specifically, my improvement pertains to engines capable of producing jets of the intermittent type; that is, short blasts rapidly succeeding each other, the series of explosions necessary for that purpose being effected by admission of a fuel-and-air mixture into a combustion chamber and by being ignited therein.

While this type of engine is already well known, the specific object of my improvement is to provide an engine of higher efficiency, this by the improved manner of supplying fuel to the combustion chamber by effecting a better commingling of air and fuel before the mixture reached the combustion chamber and by improved means of controlling the rapidity of the sequence of explosions within said combustion chamber. Another object of my improvement is to provide means whereby the fuel to be used in producing gases by means of combustion is delivered in most dispersed condition and already heated to a relatively high temperature in order to aid in the expansion and dispersion of the fuel when delivered towards the combustion chamber by means of special nozzles used for that purpose.

Another object of my improvement is to provide automatic means to keep the fuel at a desired temperature before it is released by said nozzles. A further object is to provide a jet engine which utilizes a highly volatile fuel, such as propane, for starting and, after warming up to the proper operating temperature, automatically switches over to the use of a less volatile and more economical fuel such as kerosene or fuel oil.

I shall now describe my improvement with reference to the accompanying drawings in which:

Figure 1 is a side elevation of my engine with auxiliary elements shown in a diagrammatic presentation;

Figure 2 is a longitudinal, sectional view of a front part of the engine including the intake for air and fuel, the combustion chamber, and control elements interposed therebetween;

Figure 3 is an enlarged, sectional view of the elements interposed between the intake and the combustion chambers of the engine, the view presenting certain elements in different operative positions than shown in Figure 2;

Figure 4 is an exploded, perspective view of the principal elements disposed between the intake end and the combustion chamber of the engine;

Figure 5 is an enlarged, perspective view of the flame-arresting means being a part of my engine assembly;

Figure 6 is a sectional view taken on line 6—6 of Figure 1;

Figure 7 is a sectional view taken on line 7—7 of Figure 1;

Figure 8 is a side elevation of a modified species of temperature-control means for fuel conducting pipe in my engine assembly;

Figure 9 is a sectional view taken on line 9—9 of Figure 8.

Similar numerals refer to similar parts throughout the several views.

Basically, the engine includes three primary parts: The charging tube at the front, the combustion chamber in the middle and the discharge tube at the end. All these parts are made of sheet metal, being connected, end to end, in an axial relation to each other as best shown in Figures 1 and 2. The charging tube, generally indicated by numeral 10, consists of a cylinder 13 fully open at the front and opening, at its inner end, into a member 14 made in the form of a frustum of a cone which expands in the direction away from the cylinder 13.

Provided with a threaded rim 15, said member 14 is threaded into an annular clamp 16 provided with an annular flange 17. Joined to said clamp 16 in an axial relation thereto, by means of a flange 18, is a clamp 19, threaded on its inner side at 20, said threaded portion serving as a means of connecting the above-said combustion chamber 11 to the front end of the engine.

Interposed between the charging tube 10 and the combustion chamber 11 is what may be called an air diffuser, generally indicated by numeral 21. This is a circular structure including an annular frame 22 having its interior space divided by a diametrical partition 23. A plurality of fins 24, disposed parallel in a spaced relation to each other, extend in each one-half of the interior space of the frame from said partition 23 to the circular wall frame 22, the spaces 25 between the fins being open to provide passageways for entry of combustible mixture from charging tube 10. To best serve the object for which the fins have been designed, they are wedge-shaped, being tapered towards the front of the engine.

To control the admission of said combustible mixture through said openings 25, I am using a shutter 26 made in the form of a circular disc provided with a plurality of slots 27, the slots being disposed parallel to and in a spaced relation to each other, to correspond to the spacing of openings 25 in the diffuser which was described above. The slots are arranged in two rows on each side of the central web 28 which, when the shutter is in position, is aligned with partition 23 in said diffuser.

Disposed directly behind the shutter so as to face it, is a flame-arrester. This includes a drum-like casing 29 of a diameter equal to that of the diffuser, the inner space of the casing being divided by parallel partitions 29a into a plurality of chambers 30, each chamber being open toward the front and towards the rear, as shown by numeral 35, and each containing a core 31. The core is made up of a number of corrugated, thin metal plates 32 arranged in layers, one upon the other, but separated from each other by flat sheet-metal plates 33. This results in the formation of a plurality of small channels 34 disposed parallel to the axis of the engine and open towards the front and towards the rear. The above-said open ends of chamber 30 are arranged in a manner to correspond to the openings 27 in shutter 26. The core-forming members are retained in place within the drum 29 by means of a circular plate 29b having therein apertures 29c opening into the respective chambers 30.

The above-said members, that is, the diffuser, the shutter and the flame arrester are held in alignment in their relative positions with respect to the charging tube of the engine and the combustion chamber by means of said connecting clamps, 16 and 19, the latter having a shoulder 36, on its inner side, to act as a means of keeping the flame-arrester in place, in abutment with the shutter 26, the latter again being held in place against the diffuser 21.

The body of the shutter 26 includes a radially extending shank 37 passing through a slot 38 which is formed between the flanges 17 and 18 of clamps 16 and 19, respectively. The end portion of the shank is split and formed into eyes 39 for pivotal connection, by means of bolt 40, to arm 41 of a two-arm lever indicated generally by numeral 42 and fulcrumed at 43. An extension 41a on arm 41 fits into a yoke 86 cushioned at top and bottom by a layer of rubber 87. The opposite arm of lever 42 is connected by means of a short rod 45 to a piston 46 in a short cylinder 47 disposed radially with respect to, and opening into, the combustion chamber 11 as best shown in Figure 2.

As will be described hereinbelow, the shutter is adapted to be moved, reciprocably, up and down; first to admit a charge of fuel and air into the combustion chamber, and then to close the combustion chamber preliminary to the explosion of the charge within said chamber. In order to time the operation of the shutter for the best efficiency of the engine, I have devised means whereby said operation of the shutter may be accelerated or delayed with respect to the time of the explosion of a charge within the combustion chamber. The means include a short, leaf spring 48, one end of which fits loosely into a slot 49 in the end of extension 41a of arm 41 of lever 42. The opposite end of the spring is affixed to an arm 50 of a lever 51, the lever being fulcrumed at 52 and having an arm 53 for selective connection, along an arcuate member 54 mounted on a bracket 55, which is affixed to member 14 of the body of the engine. The purpose of the mechanism just described is to cause the free end of the spring to exert pressure against the body of the shutter upwardly or downwardly as the case may be. The operation of the mechanism will be described below.

I shall now describe means designed by me to supply the engine with the necessary fuel for combustion therein. Some of the elements provided by me for that purpose—such as heating pipes and switches—are located on the body of the engine as already described; other elements—such as tanks, motors, etc.—are located in the body of the vehicle which is to be propelled by my engine, such a body being, for instance, the fuselage of a plane.

I have found it desirable to use in my engine, in the initial stages of its operation, when the parts of the body of the engine are relatively cold, a fuel of high volatility such as propane, methane or naphtha, a quantity of which is enclosed in tank 56. Natural evaporation of such fuels creates some pressure within the tank. However, to insure a sufficient degree of pressure for starting and warming up the engine, I have provided a small air compressor 57 operated by an electric motor 58. The operation of the motor would force into tank 56 a quantity of air through pipe 59. Forced out under the pressure of gas or air within tank 56, fuel for the operation of the engine is conveyed thereto by means of a tube 62. The latter is equipped with a valve 63 operated electrically by means of a solenoid control indicated, generally, by numeral 64.

I wish to state at this point that, in the arrangement of pipes and means to control admission of fuel to my engine, I am employing a number of switches and thermostatic controls which are all connected to an electric battery indicated here, generally, by numeral 65. These controls will be mentioned, one by one, in the course of the details of the description of the elements of my engine.

Resuming the description of the means to convey fuel towards the body of the engine, I wish to point out that tube 62 for conveyance of fuel from tank 56 is also provided with a check valve 66 which permits passage of fluid in only one direction namely, out of the tank. A T 67 joins tube 62 leading to a fuel-heating unit mounted upon the outer surface of discharge tube 12, indicated generally by numeral 68.

For the purpose of description, the unit may consist of a single pipe reversely bent upon itself in hair-pin loops to form several parallel lengths of said pipe, one length of the pipe forming the bottom member and the other members being disposed one above the other as shown in Figure 1. Individual lengths of pipe, as best shown therein, are indicated by numeral 70, the loops at the end being indicated by numeral 71. The outer end of the pipe, marked 72, leads into fuel line 73 which is covered by an insulating coat 74 and is mounted on the outside of the combustion chamber and the outside of the intake end of said engine. As best shown in Figure 1, said fuel line 73 leads to the front end of charging tube 13 and terminates in a two-arm, hollow bracket 75, each arm being equipped with a fuel-discharge nozzle 75a.

The respective lengths of pipe 70 are supported in place by means of brackets 76 secured to the body of the discharge tube by means of screws 77 as best shown in Figure 7. Extending along each length of pipe 70 is an oblong jacket 78, semi-circular in cross-section and adapted for partial rotation along the axis of the respective length of pipe 70. For this purpose, each jacket 78 carries a pinion 79, its teeth 82a being meshed with teeth 81a of an arcuate rack 80. A member 81, extending radially from rack 80, is provided with a slot 82, serving for reception of one end of lever 83. The opposite end of the lever forms a right-angle elbow 84, being in abutment with a pin 85 actuated by a thermostatic control within said tube 73.

The right-angle elbow is fulcrumed at 88 so that the expansion of pin 85 will swing lever 83 in an arc from said fulcrum. As a result, the lever will cause a limited rotary movement of the rack along an arcuate path with respect to the axis of the discharge tube as indicated by dotted lines 80a shown in Figure 6. Actuating the pinions on jackets 78, the rack will cause a swing of the jackets to a position where its jacket will be interposed between the respective tube 70 and the outer surface of the discharge tube 12, making each jacket act as a baffle.

A heavier and more economical fuel, such as kerosene or fuel oil, is to be supplied to the engine after the initial starting and warming-up period of operating said engine on highly volatile fuel from tank 56. This heavier fuel is contained in tank 115 and is conducted by a pipe 89 to a rotary pump 90, the latter being operated by a motor 91. The fuel is forced by the pump to the heating unit 69 through lines 95 and 68. A check valve 94 is installed in line 95 and allows fuel to flow from pump 90 to the engine but prevents fuel from flowing back into tank 115 when the pump is stopped. The operation of the pump is controlled by a thermostatic switch 107, a relay switch 110a, and pressure switch 92.

To conclude the description of the parts of my engine, I wish to add that a valve 96 controls the supply of fuel to nozzles 75a, said valve being operated by means of an electro-magnetic device 97, this being either a solenoid or a motor. As a means of igniting the combustible mixture within the combustion chamber of my engine, I am employing a glow plug 98, best shown in Figures 1 and 2.

In conjunction with the parts already described, I am employing a variety of switches and thermostatic controls to which allusion has been made. These are connected by suitable wiring means to a source of electric current, such as an electric battery 65, which may be charged by a generator 113 operated by a gasoline motor 114.

The supply of current to the respective elements of my engine is controlled by means of a series of switches on a control board 99 and connected to the source of electric current, that is, to said battery 65, by means of a wire 100. A two-way switch 101 controls, by means of wires 102 and 102a, the operation of valve 96; switch 103 controls by means of wire 104 the operation of glow plug 98; while a two-way switch 105 controls, by means of wires 106 and 106a, the solenoid 64 controlling supply of fuel to the engine from tank 56.

After having described the above parts, I shall describe the operation of my engine as follows:

In starting the engine, switch 103 is first closed, which allows current to flow to glow plug 98. Next, switch 105 is closed in order that the solenoid 64 may be energized to open valve 63, permitting fuel to flow from pressure tank 56 up through the fuel-heating unit 69, then through pipe 73 to valve 96. This valve is then opened by means of a small motor device 97, controlled by a two-way switch 101, permitting fuel to be delivered towards nozzles 75a to discharge said fuel into the charging tube 13 and into member 14, in the form of high-velocity, gaseous, cone-shaped jets, the angle of the cone being about 8° with respect to the axis of the respective jet, each jet drawing in and mingling with air in the path thereof. The mixture of air and fuel now enters the free spaces 25 between fins 24, through the openings 27 in shutter 26, next the channels 34 in the flame-arresting member 29, and into the combustion chamber 11 where said mixture is ignited by glow plug 98. The ensuing explosion creates a pressure within the chamber.

Under the pressure created by the explosion of the fuel mixture, piston 46 within cylinder 47 is pushed outwardly, rocking the two-arm lever 42 on its fulcrum 43, causing the shutter 26 to be moved upwardly to close openings 25 between fins 24 in the diffuser 21. As a result thereof, the exploded gases within the chamber have only one way of escaping, namely out through the discharge tube or nozzle 12. Blowing out at high velocity, they create a partial vacuum in combustion chamber 11, whereupon atmospheric pressure outside the combustion chamber will push the piston 46 inwardly, returning it to its original position. The movement of the piston, conveyed to lever 42 by means of connecting rod 45, will cause the shutter to be drawn downwardly to bring openings 27 within said shutter in register with the openings 25 in the diffuser 21, thus permitting entry of a fresh supply of the air-and-fuel mixture from the direction of nozzles 75a, when the cycle will repeat itself and continue to do so, each charge being exploded successively by the glow plug in the combustion chamber. The gases resulting from the combustion will be ejected in successive puffs out of the tail pipe, creating a series of thrusts in the direction opposite to that of the travel of said gases.

By virtue of the mechanism already described by me, it is possible to accelerate or to retard the operation of the shutter for admission of a new charge of the air-and-fuel mixture into the combustion chamber following the explosion of the preceding charge. This is effected by means of a lever-and-spring combination operated by arm 41a of lever 42. By a swing of arm 50 of lever 51, it is possible to cause spring 48 to bear against said arm 41a downwardly as shown in Figure 1.

In this position, the spring, by means of said arm 41a, will bear against the lower part of the shutter 26 in a downward direction and will counteract the upward thrust of piston 47, thus delaying the closing of the shutter. Should said arm 50 be swung upwardly, said spring 48 will bear upwardly against shutter 26 and, acting in conjunction with the outward thrust of piston 47, will accelerate the closing of the shutter. The position of said spring may be adjusted, as already indicated in the description of the mechanism, by means of an arm 53.

It may be added here that, after the initial explosion, the glow plug may be turned off as the wall of the combustion chamber and the elements therein will be hot enough to ignite the fuel-and-air mixture without the need of any plug.

At this point, I also wish to refer to the flame-arresting device. There is no novelty in the device by itself, but I am employing it as a part of a combination of elements as shown by me, the device being employed to prevent the flame in the explosion chamber from igniting the fuel mixture before its entry into said chamber.

As already described, I am employing a pump 57, driven by motor 58, for the purpose of supplying air to tank 56. I am also utilizing in said pump-and-tank arrangement a switch 60 controlling the operation of the motor, said switch being responsive to pressure of air within said tank. The tank, it will be noted, is connected to said switch by means of pipe 61. The switch is of a type which is, normally, closed and which will open when the pressure within the tank reaches 150 lbs. per sq. inch, but will close when the pressure drops below that limit.

Upon a short period of operation of the engine on fuel from tank 56, a thermostatic switch 107 will be closed by an element therein responsive to the rise of the temperature of fuel line 74 when said temperature has reached, say, 900° F. The switch, establishing a ground connection for current from battery 65 along lines 108 and 110, will actuate a relay switch 110a, permitting current to flow along line 112 to switch 92 and therefrom along line 93 to a motor 91 operating pump 90. The starting up of pump 90 will force kerosene or other fuel from tank 115 through lines 95 and 68 to heater 69. It will also bring about an automatic changeover from starting fuel to running fuel, in the following manner.

A pressure switch 92, operatively connected to fuel line 95, is responsive to pressure changes therein. The switch is of a type which is, normally, closed but may be pre-set to open when said pressure reaches 200 lbs. per sq. inch, and to close again when the pressure has dropped, say, to 195 lbs. per sq. inch. After relay 110a has closed, then the pressure switch will automatically start and stop motor 91 at the proper times necessary to maintain the fuel pressure in line 95 within the pre-set 195 to 200 pound limits. After pump 90 starts and builds up a pressure in line 95 exceeding the pressure in line 62, some of the fuel from line 95 will flow through T 67 to check valve 66, closing said check valve and stopping the flow of starting fuel from tank 56. Pressure switch 60 will cause motor 58 to stop and thus prevent excessive pressure from building up in tank 56.

As already intimated, the object of the heating device 69 is to bring the temperature of the fuel up to the most efficient condition, which must be, as I have ascertained by experiments, below 1100 degrees F. To prevent excessive heating of the fuel when said fuel would dissociate and fill the line with carbon, I have employed the means described above for shielding said pipe 70 from the heat radiated by discharge tube 12. The operation of said device is controlled by a thermostatically expanded pin 85 and lever 83.

Another, simpler species of said control is shown in Figures 8 and 9. This includes a substantially arcuate rectangular plate 117 disposed between fuel-heating lengths of pipe 70 and the outer surface of discharge tube 12. The plate 117, which is provided with a plurality of slots 118 with solid spaces 119 therebetween, is suspended by means of hinges 120 on cranks 121 mounted on a rotary shaft 122. The latter is controlled by the above-said lever 83 by means of a radial arm 123, to which arm said lever is pivotally connected at its outer end. The result will be that, when the lever describes an arcuate movement in response to the expansion of pin 85, which is shown in Figure 1, the shaft 122 will be partly rotated, causing crank 121 to lift said plate 117 so that the solid spaces 119 in said plate will be interposed between the outer surface of discharge tube 12 and said fuel-conducting pipes 70. It will be understood that, normally, the pipes are exposed to the radiation of heat from said discharge tube 12 through said slots 118 and that the shift of the plate will bring said solid spaces 119 into position between pipes 70 and said discharge tube 12. As a result thereof, the plate 117 will act as a baffle plate against the radiation of heat from tube 12 to pipes 70.

It will be obvious that some details of construction disclosed herein may be changed without departing from the inventive principles disclosed. What I, therefore, wish to claim is as follows:

1. In a jet engine, including a charging tube at the front for admission of fuel, a combustion chamber back of the charging tube for combustion of said fuel, and a discharge tube back of said chamber, said discharge tube to be heated by gases resulting from said combustion, fuel-delivery means comprising tank means with fuel, motor means to create air pressure within said tank means, a fuel-heating unit comprising pipe means disposed parallel to the discharge tube for exposure to the radiation of heat therefrom, pipe means leading from the tank to said heating unit and a fuel line to convey fuel from the heating unit to the front end of the charging tube, said fuel line terminating in a hollow bracket in front of the charging tube, a plurality of nozzles opening from said hollow bracket to release fuel in jets into the charging tube, baffle means disposed between the pipes of the heating unit and the wall of the discharge tube, and thermostatic-control means adjacent the fuel line and responsive to the rise of temperature thereof to actuate the baffle means, to vary the amount of radiation from the discharge tube towards the pipes of the heating unit.

2. In a jet engine including a charging tube at front for intake of air and fuel, a chamber back of the charging tube, open to the front and rear, fuel-igniting means therein and a discharge tube back of said chamber, said tube being heated by gases of combustion, a tank with liquid fuel, compressor means to keep the fuel under pressure, a fuel-heating unit disposed adjacent to and exposed to the radiation of heat from said discharge tube, pipe means to convey fuel from the tank to the fuel-heating unit, baffle means between said heating unit and the discharge tube, a fuel line to convey fuel from the heating unit to the front of the charging tube, sprayer means at the outer end of said fuel line to release fuel in jets into the charging tube, thermostatic control means adjoining said fuel line and responsive to the temperature changes thereof to actuate said baffle means to control the amount of radiation from the discharge tube towards the pipes of the heating unit.

3. In a jet engine including, in axial alignment, a charging tube having a front end for intake of fuel, a chamber for combustion of the fuel back of the charging tube and a discharge tube back of said chamber, said tube being heated by gases of combustion, a tank with liquid fuel, compressor means to keep the fuel under pressure, a fuel-heating unit composed of a pipe in a plurality of parallel lengths, the heating unit being disposed adjacent to and exposed to the radiation of heat from the discharge tube, baffle means between said heating unit and the discharge tube, a pipe to convey the fuel from the tank into the heating unit and a pipe leading therefrom to the front end of the charging tube, sprayer means at the outer end of the last-named pipe to release fuel in jets into the charging tube, thermostatic control means adjoining said last-named pipe and responsive to the temperature changes thereof, to actuate said baffle means to control the amount of radiation from the discharge tube towards the pipes of the heating unit.

4. In a jet engine including, in axial alignment, a charging tube at the front for intake of a fuel-and-air mixture, said charging tube including a cylindrical member and a frusto-conical member expanding rearwardly of said cylindrical member, a chamber for combustion of the fuel-and-air mixture back of the charging tube, and a discharge tube back of said combustion chamber, said tube being adapted to be heated by the gases of combustion, a tank with a liquid fuel, compressor means to keep the fuel under pressure, pipe means to convey fuel from the tank to the front of the charging tube and including a fuel-heating unit, said unit comprising a plurality of lengths of fuel-conveying pipe, a rotary jacket, semi-circular in cross-section, adjoining each length of the pipe and extending parallel thereto, thermostatic control means responsive to the rise of temperature of the fuel-conducting pipes, to swing the jackets into position between the pipe lengths of the heating unit and said discharge tube, sprayer means at the outer end of the fuel-conveying means, to release fuel in jets into the charging tube, thermostatic control means responsive to the temperature changes of the means to convey fuel from the heating unit to the sprayers, to actuate said jackets to shield the pipes of the heating unit against heat radiated from said discharge tube.

JOHN J. WALL.

REFERENCES CITED

The following references are of record in the file of this patent:

UNITED STATES PATENTS

| Number | Name | Date |
| --- | --- | --- |
| 1,405,482 | Bostedo | Feb. 7, 1922 |
| 2,124,462 | Cummings | July 19, 1938 |
| 2,142,601 | Bleecker | Jan. 3, 1939 |
| 2,395,113 | Goddard | Feb. 19, 1946 |
| 2,435,990 | Weiler | Feb. 17, 1948 |
| 2,446,266 | Cummings | Aug. 3, 1948 |
| 2,479,776 | Price | Aug. 23, 1949 |
| 2,483,045 | Harby | Sept. 27, 1949 |
| 2,496,351 | Mazzoni | Feb. 7, 1950 |
| 2,505,757 | Dunbar et al. | May 2, 1950 |